United States Patent [19]

Collette et al.

[11] Patent Number: 4,928,835
[45] Date of Patent: May 29, 1990

[54] INJECTION MOLDED PREFORM, METHOD OF TREATING SAME AND CONTAINER FORMED THEREFROM

[75] Inventors: Wayne N. Collette, Merrimack, N.H.; Ralph Armstrong, Weston, Conn.

[73] Assignee: Continental PET Technologies, Inc., Norwalk, Conn.

[21] Appl. No.: 304,469

[22] Filed: Jan. 31, 1989

[51] Int. Cl.⁵ .................. B29C 49/06; B29C 49/04; B65D 1/02; B65D 23/00

[52] U.S. Cl. .................. 215/31; 215/1 C; 264/25; 264/235; 264/346; 264/521; 264/532; 264/535; 428/357; 428/36.92; 428/542.8

[58] Field of Search .............. 215/1 C, 31; 428/35.7, 428/36.6, 36.7, 36.92, 542.8; 264/25, 235, 346, 520, 521, 532, 535

[56] References Cited

U.S. PATENT DOCUMENTS

| | | | |
|---|---|---|---|
| 4,179,488 | 12/1979 | Nishikawa et al. | 264/521 |
| 4,358,491 | 11/1982 | Ota et al. | 264/521 X |
| 4,379,099 | 4/1983 | Ota et al. | 215/1 C X |
| 4,572,811 | 2/1986 | Ota et al. | 264/521 X |
| 4,589,559 | 5/1986 | Hayashi et al. | 215/31 X |
| 4,590,021 | 5/1986 | Ota et al. | 264/25 |

FOREIGN PATENT DOCUMENTS

| | | | |
|---|---|---|---|
| 55595 | 7/1982 | European Pat. Off. | 215/1 C |
| 136222 | 4/1985 | European Pat. Off. | 215/1 C |
| 5892535 | 6/1983 | Japan | 264/521 |
| 6096435 | 5/1985 | Japan | 264/520 |
| 1244738 | 10/1986 | Japan | 215/1 C |
| 2208345 | 9/1987 | Japan | 215/1 C |

Primary Examiner—Sue A. Weaver
Attorney, Agent, or Firm—Charles E. Brown; Paul Shapiro; Charles A. Brown

[57] ABSTRACT

A polyester preform which is injection molded preferably of PET and wherein the preform is provided with a molded neck finish or neck portion inlcuding threads which are molded to a high tolerance and wherein the neck finish may receive a closure cap of the type having a tamper indicating band which engages over a retaining bead also molded to a high tolerance as part of the neck finish. In order to maintain the container which is blow molded from the preform in axial alignment with the neck finish and thus eliminate the perpendicularity problem, a ring of the preform immediately below the flange which functions as the capping ring, is heated to a high temperature and crystallized. In a like manner, the end sealing surface is also heated to a high temperature and crystallized. The remainder of the neck finish remains in its amorphous state without disturbing the configuration of either the threads or the retaining bead. This combination of crystallized portions with the remainder of the neck finish remaining amorphous assures a high quality connection between a closure cap, whether the closure cap is formed of plastic or metal, while providing the end sealing surface with a hard tough finish resisting deformation and at the same time reducing the closure cap removal torque.

19 Claims, 1 Drawing Sheet

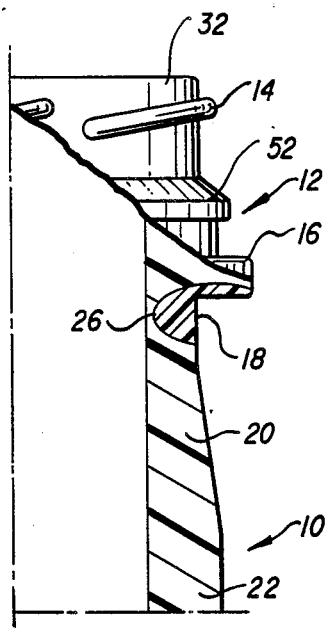
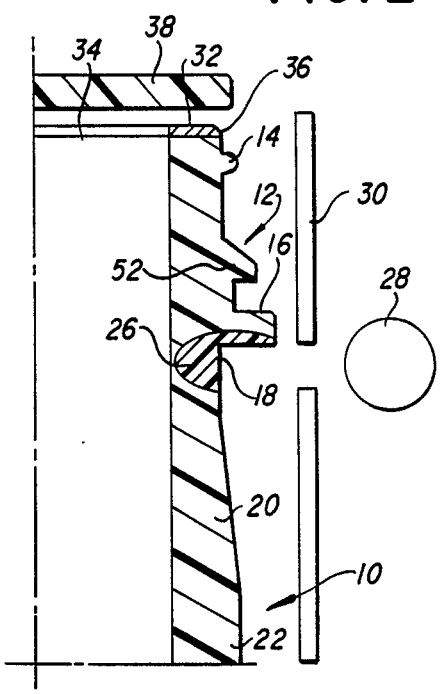
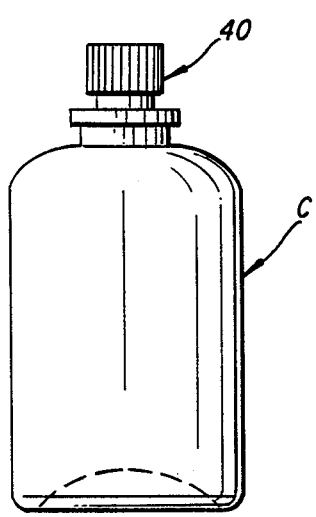
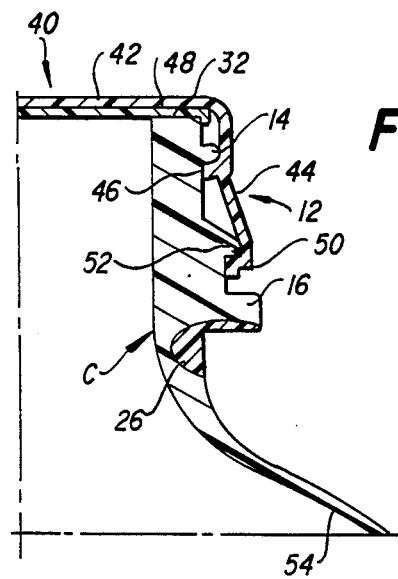

INJECTION MOLDED PREFORM, METHOD OF TREATING SAME AND CONTAINER FORMED THEREFROM

This invention in general relates to new and useful improvements to injection molded preforms from which containers are blow molded, and more particularly to a preform which is provided with a molded neck portion including threads for receiving a closure cap and the crystallization of only certain parts of the neck portion for beneficial effects.

In the customary reheat blow molded polyester (PET) container, the neck portion or neck finish and an annular part of the resultant container immediately below the customary capping flange of the neck portion are unoriented. Then there is a rapid orientation transition in a shoulder portion with there being a maximum biaxial orientation in a body of the container. Such containers for hot fill applications are normally blow molded within heated molds having a temperature at the completion of the blow molding operation which is greater than the glass temperature of the particular polyester resin from which the container is formed. This orientation and thermal conditioning process increases the relative Tg of the oriented regions to a level substantially above that of the unoriented amorphous regions. As a result of the high mold temperature and the low Tg of the unoriented polyester resin, the unoriented annular part immediately below the capping flange shrinks upon mold opening to excess with a resulting tilting of the neck portion relative to the container body.

In accordance with the teaching of Ota et al U.S. Pat. No. 4,572,811 granted Feb. 25, 1986, it is taught that one may crystallize a preform wholly from the periphery in the center of its bottom. The Ota et al patent also teaches that one may either crystallize the entire neck portion of the blow molded container or may provide the container with a special neck end which is the only crystallized part of the neck portion. On the other hand, Hayashi et al U.S. Pat. No. 4,589,559 granted May 20, 1986 teaches that the entire neck portion of a polyester preform to be blow molded into a container is to be crystallized.

The crystallization of a polyester resin (PET) results in the resin being made more dense with the resultant shrinkage. Further, the shrinkage is not uniform. The net result is that when one crystallizes the neck portion of a polyester resin preform, threads of such neck portion, which are molded with a very high precision, become distorted and somewhat defective. Further, when the neck portion is provided with interrupted threads and a retaining bead, the control as to dimensional accuracy required to receive a plastic tamper band indicating closure cap is hampered.

In view of the foregoing, it will be readily apparent that it is undesired to follow the teaching of the prior art to crystallize the entire neck portion of either a blow molded polyester container or an injection molded preform.

There has been concurrently developed a polyester (PET) preform wherein crystallization is restricted to a ring immediately below the capping flange and above the shoulder forming portion of the preform. This is the subject of a commonly assigned pending application.

It has been found that while the crystallization of a ring portion of the polyester preform immediately below the capping flange does maintain axial alignment of the blow molded container body with the neck portion, the amorphous neck portion still has certain deficiencies. This is particularly true when the resulting container is to receive a screw threaded metal closure cap of the type having lugs for engaging multiple threads on the container or a plastic closure with a tamper indicating band for engagment beneath a retaining bead.

In accordance with this invention, in addition to crystallizing a ring of the preform immediately below the capping flange, the end sealing surface is also crystallized to a relatively small depth.

With the above and other objects in view that will hereinafter appear, the nature of the invention will be more clearly understood by reference to the following detailed description, the appended claims, and the several views illustrated in the accompanying drawings.

FIG. 1 is a fragmentary half sectional view of an upper part of a preform formed in accordance with this invention with portions shown in elevation.

FIG. 2 is a half sectional view of the preform of FIG. 1 and shows the manner in which limited areas of the preform are crystallized.

FIG. 3 is a fragmentary elevational view of a filled and closed container blow molded from the preform of FIG. 1.

FIG. 4 is an enlarged fragmentary sectional view taken through the neck portion of the container of FIG. 3 and shows the details of a plastic closure cap thereon.

Referring now to the drawings in detail, it will be seen that there is illustrated in FIG. 1 an upper portion of a conventional preform formed in accordance with this invention. The preform, which is identified by the numeral 10, is injection molded of a saturated polyester, preferably polyethylene terephythalate (PET) with the preform 10 being of a conventional configuration.

The preform 10 includes an upper neck portion or neck finish 12 which is generally provided with thread means 14 for receiving a closure cap and which includes a lower annular flange 16 which is generally known in the trade as a capping flange or capping ring.

Immediately below the flange 16, the preform 10 is provided with a short cylindrical portion 18 which, in the heating of the preform prior to the blow molding of the preform in a blow mold to form a container, is not heated to an orientation temperature. Below this short cylindrical portion 18 the thickness of the preform 10 gradually increases in what is described as a shoulder forming portion 20. Below the shoulder forming portion 20, the preform becomes generally of a constant thickness and becomes a body forming portion 22. The above discussed axial alignment or perpendicularity problem lies in the portion 18. It is this portion of the preform 10 which is clamped in a blow mold during the inflation of the preform 10 to form a container such as the container C shown in FIG. 3.

Referring once again to FIG. 1, it will be seen that there is illustrated a shaded area at the top of the cylindrical portion 18 which defines a thermally crystallized ring or annular part 26. The crystallinity is preferably between 30 and 45% with the result that the plastic material preform 10 in this area is more dense and the glass temperature is greatly increased.

As is clearly shown in FIG. 2, it will be seen that the thermally crystallized ring 26 is formed by rotating the preform 10 about its axis while it passes along a quartz infrared heater 28. A mask 30 is positioned between the heater 28 and the preform 10 so as to restrict the area which is heated and thus crystallized. While it is preferred that the ring 26 be restricted to the cylindrical portion 18, the heating and thus crystallization may extend into the underside of the flange 16 as is clearly shown in the drawings.

While the thermally crystallized ring 26 has been found to solve the problem of perpendicularity, it has been found that other improvements in the preform 10 are desired. Most specifically, it is additionally desired that an end sealing surface 32, which as is best shown in FIG. 2, defines an open end or mouth 34, be of an increased density and thus hardened. Therefore, the end sealing surface 32 is also heated and crystallized as at 36.

The crystallization of the end sealing surface portion 36 is effected by moving the rotating preform beneath a flat heater strip 38. The strip heater 38 is maintained at the temperature of 700°-800° F. and is placed 1.0-2.0 mm above the path of the end sealing surface 32.

The strip heater 38 is of a length along the path of the preform 10 such that the end sealing surface 32 is heated for a period of time ranging from 15 to 25 seconds depending upon the PET co-polyester content, the IV of the polyester and the width of the end sealing surface. The result is a crystallized end sealing surface (ESS) to a depth of 0.5-1.0 mm. The resulting percent crystallization of the ESS is 30-45% as compared to the non-treated amorphous adjacent regions of the end portion of 5-10%.

It is also to be understood that the ESS surface temperature during crystallization rises to 350±50° F. which is the maximum crystallization rate temperature for PET.

From the foregoing, it will be seen that the restricted crystallization of the upper part of the preform 10 in the areas 26 and 36 provide all of the desired advantages obtained by the overall crystallization of the upper part of the preform 10 while at the same time eliminating all of the undesirable features of crystallizing the entire neck portion 12. Thus the threads 14 retain the high tolerance dimensions as molded.

At this time it is pointed out that the crystallization of the PET increases the modulus (i.e. hardness), thus increasing its resistance to impact damage. This is highly desirable with respect to the end sealing surface 32 in that it will substantially increase the life of a returnable/refillable PET bottle which requires a non-damaged end sealing surface to permit proper cap application without $CO_2$ leakage.

With respect to the foregoing, 10 bottles each were prepared with amorphous end sealing surfaces and crystallized end sealing surfaces (1.5 liter refillable at 100 grams. With a 28 mm beverage finish). These bottles, which were filled with carbonate water at four volumes and closed with a conventional ALCOA closing machine with aluminum ALCOA closures and inspected for leakers after 24 hours at 100° F. were dropped finish first from varying heights onto a concrete floor of average roughness. The results are as follows:

| Drop | % Leakers | |
|---|---|---|
| Hgt Ft | Amorphous | Crystallized |
| Control | -0- | -0- |
| 2 | 10 | -0- |
| 4 | 40 | -0- |
| 6 | 90 | 10 |

The crystallization of the end sealing surfaces 32 also had a definite advantage over amorphous end sealing surfaces in that less torque was required to open such containers which were closed with polypropylene compounded screw threaded closures. In this test 43 mm polypropylene closures were applied at a temperature of 170° F. to both the amorphous and crystallized end sealing surface molded finish to a 15 inch-lbs. torque. After the containers were refrigerated at 45° F., the closures were removed and the opening torques recorded as follows for 20 samples of each type of container:

| | Control Amorphous | Crystallized ESS |
|---|---|---|
| In-Lbs | 28 | 23.5 |
| Range | 18-40 | 14-30 |

It has been further found that amorphous finishes do not permit the use of rigid metal closures for hot fillable PET bottle applications. The crystallized end sealing surface 32 when used in conjuction with a crystallized band 26 below the capping flange 16 permits the use of conventional metal lug or intermediate contact closure caps by maintaining the finished dimensions and opening torques after hot filling and cooling by preventing distortion in the form of ovality which reduces thread to lug contact yielding low opening torques. For example, if the thread means 14 are in the form of multiple start threads, for example four threads, and a closure cap is provided with a similar number of lugs, when the closure cap is torqued onto the neck finish, there is a tendency for the neck finish to assume a generally square cross section as opposed to the circular cross section. This greatly reduces the contact between the individual threads and the closure cap lugs. Thus if the end portion 12 is not provided with the crystallized end sealing surface 32 and the thread means 14 are permitted to remain in their amorphous state, it is not commercially feasible to apply rigid metal closure caps of the lug or intermittent contact type to the PET neck finish. On the other hand, if the entire neck portion is crystallized, then the thread means 14 will distort to the extent that proper contact between the closure cap lugs and the multiple thread starts 14 is not optimum.

Most specifically, with reference to FIGS. 3 and 4, it will be seen that the container or bottle C is closed by means of a metal closure cap 40. The metal closure cap 40 is of a conventional type and includes an end panel 42 and a depending skirt 44. The skirt 44 carries a plurality of circumferentially spaced lugs 46, one for each of the multiple thread starts 14. The lugs 46 are engaged beneath the thread starts 14 and serve to tightly clamp the ring gasket 48 carried by the closure cap 40 against the end sealing surface 32.

Further, the skirt 44 terminates in a tamper indicating band 50 which locks beneath a retaining bead 52. The retaining bead 52 is part of the neck finish of the container and is incorporated in the preform as is clearly shown in FIGS. 1 and 2.

At this time it is pointed out that the dimensions of the retaining bead 52 are also critical in that the tamper indicating band 50 must snap over and below the retaining bead 52. If the retaining bead 52 is not cylindrical in outline, but loses its cylindrical configuration, or if the average bead diameter varies in excess of $X \pm 0.005$ inches, the tamper indicating band 50 cannot properly co-act with the bead 52. This is most critical.

It is to be noted that in the formation of the container C, the shoulder forming portion 20 is radially expanded and thinned to form the shoulder 54 of the container.

While the crystallized ring 26 and the crystallized end sealing surface 32, together with the amorphous remainder of the neck portion 12 are most beneficial when the thread means 14 are of the multiple start or interrupted type for use with a metal closure having lugs, it is to be understood that, as will be readily apparent from the foregoing, these crystallized areas will also be beneficial in conjunction with thread means of the screw thread type for receiving a plastic closure cap in threaded relation.

Although only a preferred embodiment of the preform treatment and the resultant container formed from the preform by blow molding have been specifically illustrated and described herein, it is to be understood that minor variations may be made in the treatment of the preform and the resultant preform and container without departing from the spirit and scope of the invention as defined by the appended claims.

We claim:

1. A plastic preform for forming a hollow blow molded plastic container, said preform being of an injection molded construction and including a neck finish, said neck finish terminating at a free end in an end sealing surface and having remote from said end sealing surface a lower flange with there being high tolerance molded threads between said end sealing surface and said flange, said preform also including a container shoulder forming portion next to said flange remote from said threads, and a body forming portion, a part of said shoulder forming portion being a crystallized part and of a greater strength than adjacent parts of said preform, said preform being further improved by said end sealing surface being also crystallized, and said threads being free of added crystallization with said threads remaining as formed.

2. A preform according to claim 1 wherein the crystallization of said end sealing surface is to a depth on the order of 0.5 to 1.0 mm.

3. A preform according to claim 1 wherein the percent of crystallinity of said end sealing surface is on the order of 30–45% as compared to 5–10% for the threads.

4. A preform according to claim 1 wherein said threads are interrupted.

5. A preform according to claim 1 wherein said threads are separate threads for engagement by closure lugs.

6. A preform according to claim 1 wherein said plastic is a polyester.

7. A preform according to claim 1 wherein said plastic is PET.

8. A method of improving a plastic preform of the injection molded type having a neck finish including an end sealing surface, high tolerance external thread means, and a capping flange, said method comprising the steps of separately heating said end sealing surface and an annular region closely below but spaced from said capping flange to a high crystallization temperature while maintaining said preform between said crystallized end sealing surface and said crystallized annular region untreated whereby said end sealing surface becomes dense and exhibits a lowered friction co-efficient while said thread means maintain their as molded high tolerance.

9. A method according to claim 8 wherein said end sealing surface is heated to a temperature of 350°±50° F.

10. A method according to claim 8 wherein said end sealing surface is heated to a temperature of 350°±50° F. for a period of 15–25 seconds.

11. A method according to claim 8 wherein said end sealing surface is heated to a temperature of 350°±50° F. for a period of 15–25 seconds, and crystallized to a depth of 0.5–1.0 mm.

12. A method according to claim 8 wherein said end sealing surface is heated to a temperature of 350°±50° F. by passing the end sealing surface 1.0–2.0 mm below a flat strip heater maintained at a temperature on the order of 700°–800° F.

13. A blow molded plastic container comprising a neck portion, a shoulder portion leading from said neck portion to a tubular body, and said tubular body being closed by a bottom portion, a crystallized ring portion between said neck portion and said shoulder portion maintaining axial alignment of said tubular body with said neck portion, said neck portion having an open end defined by a crystallized end sealing surface and said neck portion between said crystallized end sealing surface and said crystallized ring portion being a nontreated amorphous region and including thread means for receiving a closure.

14. A container according to claim 13 wherein said crystallized end sealing surface is crystallized for a depth of 0.5 to 1.0 mm.

15. A container according to claim 13 wherein said crystallized end sealing surface is crystallized for a depth of 0.5 to 1.0 mm at a crystallinity of 30–45%.

16. A container according to claim 13 wherein there is a closure tamper band retaining bead below said thread means.

17. A container according to claim 13 wherein said thread means are in the form of a multiple start thread arrangement.

18. A container according to claim 17 wherein said container is closed by a metal closure cap having plural lugs engaging said multiple start thread arrangement.

19. A container according to claim 17 wherein there is a closure tamper band retaining bead below said thread means.

* * * * *